(12) United States Patent
Debras et al.

(10) Patent No.: US 6,417,131 B1
(45) Date of Patent: Jul. 9, 2002

(54) PRODUCTION OF POLYETHYLENE HAVING A BROAD MOLECULAR WEIGHT DISTRIBUTION

(75) Inventors: Guy Debras, Frasnes-lez-Gosselies; Phillipe Bodart, Clermont-ss-Huy, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/516,967

(22) Filed: Feb. 28, 2000

Related U.S. Application Data

(63) Continuation of application No. 08/995,513, filed on Dec. 22, 1997, now abandoned.

(30) Foreign Application Priority Data

Dec. 20, 1996 (EP) ............................................. 96120697

(51) Int. Cl.⁷ ................................................. B01J 31/02
(52) U.S. Cl. ........................ 502/120; 526/104; 526/105; 526/106; 526/348.2; 526/348.5; 526/348.6; 502/103; 502/117; 502/319
(58) Field of Search ................................. 526/104, 105, 526/106, 348.2, 348.5, 348.6; 502/103, 117, 120

(56) References Cited

U.S. PATENT DOCUMENTS 5,079,317 A * 1/1992 Tajima et al. ............... 526/106

\* cited by examiner

*Primary Examiner*—David W. Wu
*Assistant Examiner*—William K Cheung
(74) *Attorney, Agent, or Firm*—Gilbreth & Associates

(57) ABSTRACT

A process for producing high density polyethylene having a bimodal molecular weight distribution, the process comprising pre-contacting a chromium-based catalyst with an alkyl metal oxane, the chromium-based catalyst comprising chromium oxide on a silica-containing support, to form a catalyst system wherein the atomic ratio of the metal of the oxane to the chromium is less than 1, and polymerising ethylene or copolymerising ethylene and an alpha-olefinic comonomer comprising from 3 to 10 carbon atoms in the presence of the catalyst system. A catalyst system for polymerising ethylene or copolymerising ethylene and an alpha-olefinic comonomer comprising from 3 to 10 carbon atoms to produce high density polyethylene, the catalyst system comprising in combination a chromium-based catalyst comprising chromium oxide on a silica-containing support and an alkyl metal oxane with which the chromium-based catalyst has been precontacted whereby the atomic ratio of the metal of the oxane to the chromium is less than 1. A process for producing high density polyethylene having a bimodal molecular weight distribution, the process comprising polymerising ethylene or copolymerising ethylene and an alpha-olefinic comonomer comprising from 3 to 10 carbon atoms in the presence of a catalyst system comprising a chromium-based catalyst, comprising chromium oxide on a silica-containing support, and an alkyl metal oxane in an amount of around 0.45 wt % based on the weight of the chromium-based catalyst.

5 Claims, 9 Drawing Sheets

Figure 1:
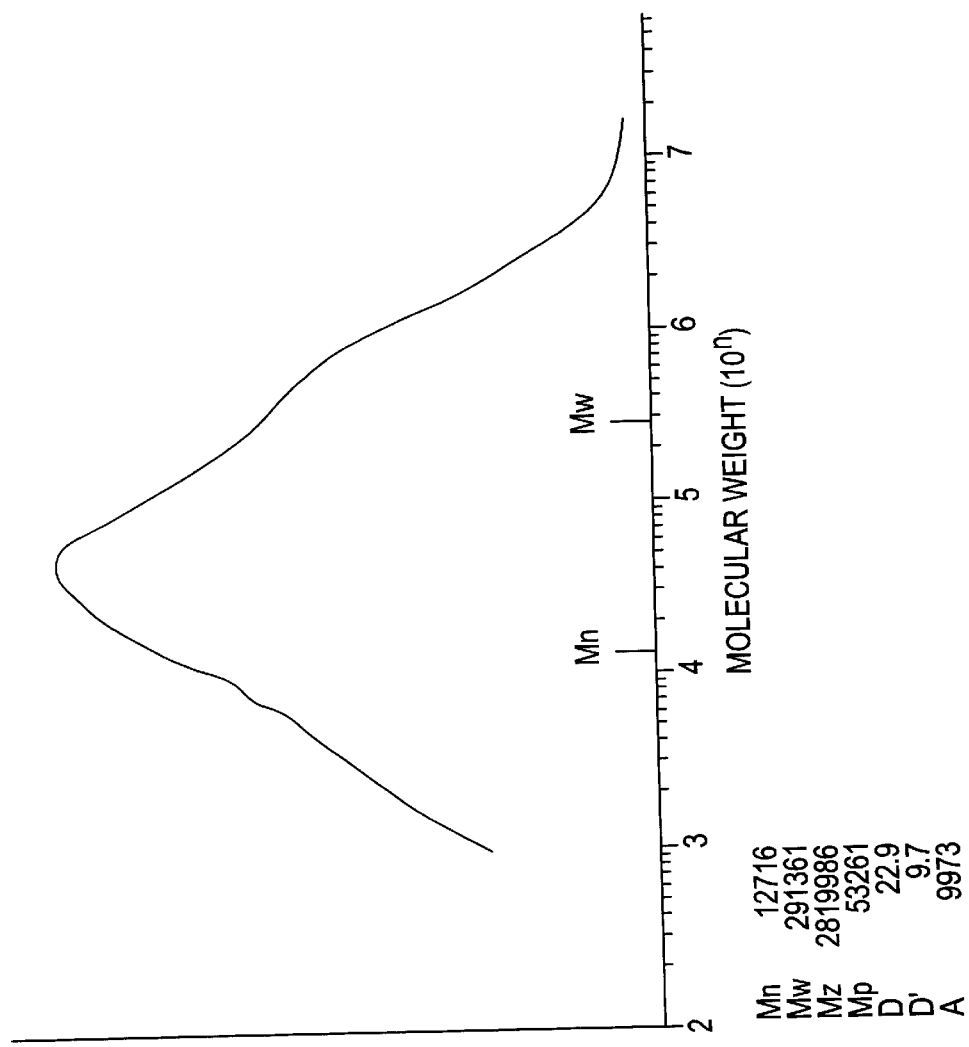
Figure 2:
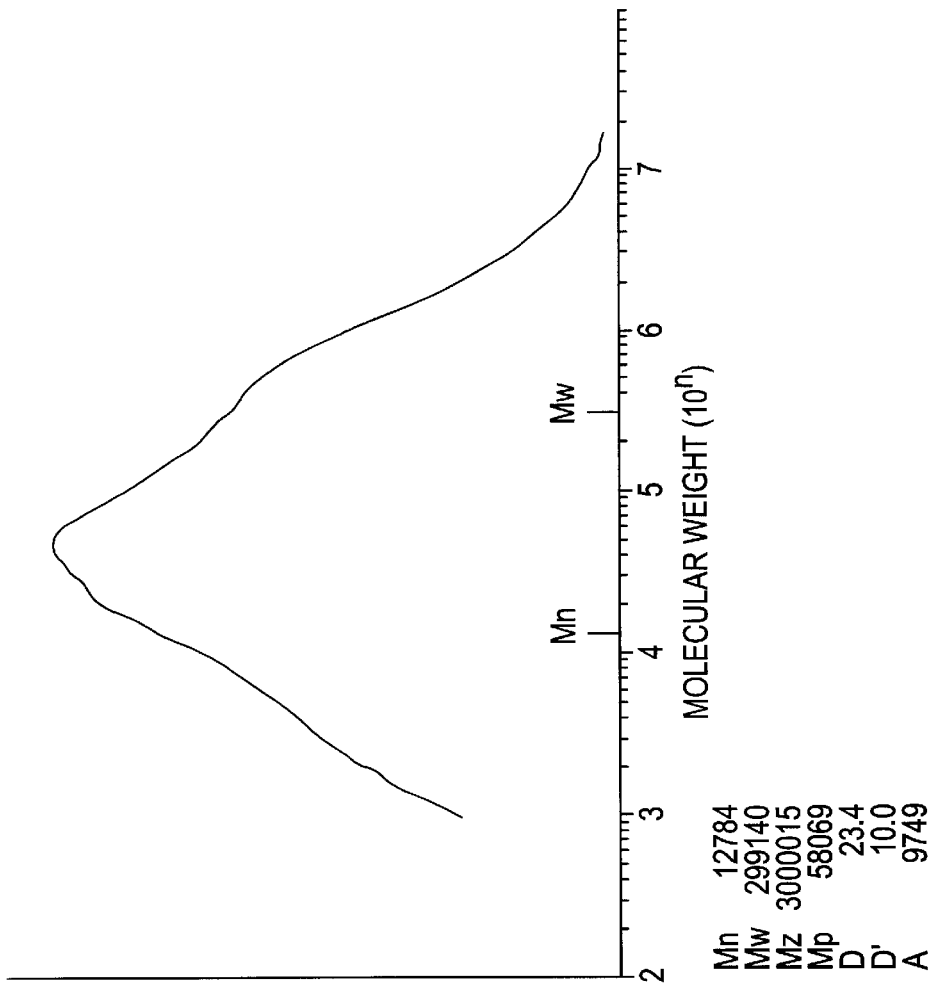

| | |
|---|---|
| Mn | 12716 |
| Mw | 291361 |
| Mz | 2819986 |
| Mp | 53261 |
| D | 22.9 |
| D' | 9.7 |
| A | 9973 |

PRODUCTION OF POLYETHYLENE HAVING A BROAD MOLECULAR WEIGHT DISTRIBUTION

This is a continuation of application Ser. No. 08/995,513, filed on Dec. 22, 1997, now abandoned.

The present invention relates to a process for the production of polyethylene in particular high density polyethylene (HDPE) having a bimodal molecular weight distribution. The present invention further relates to a catalyst system for production of HDPE and to the use of such a system.

For polyethylene, and for high density polyethylene (HDPE) in particular, the molecular weight distribution (MWD) is a fundamental property which determines the properties of the polymer, and thus its applications. It is generally recognised in the art that the molecular weight distribution of a polyethylene resin can principally determine the physical, and in particular the mechanical, properties of the resin and that the provision of different molecular weight polyethylene molecules can significantly affect the rheological properties of the polyethylene as a whole.

Since an increase in the molecular weight normally improves the physical properties of polyethylene resins, there is a strong demand for polyethylene having high molecular weight. However, it is the high molecular weight molecules which render the polymers more difficult to process. On the other had, a broadening in the molecular weight distribution tends to improve the flow of the polymer when it is being processed at high rates of shear. Accordingly, in applications requiring a rapid transformation employing quite high inflation of the material through a die, for example in blowing and extrusion techniques, the broadening of tie molecular weight distribution permits an improvement in the processing of polyethylene at high molecular weight (this being equivalent to a low melt index, as is known in the art). It is known that when he polyethylene has a high molecular weight and also a wide molecular weight distribution, the processing of the polyethylene is made easier as a result of the low molecular weight portion and also the high molecular weight portion contributes to a good impact resistance for the polyethylene film. A polyethylene of this type may be processed utilising less energy with higher processing yields.

The molecular weight distribution can be completely defined by means of a curve obtained by gel permeation chromatography. Generally, the molecular weight distribution is defined by a parameter, known as the dispersion index D, which is the ratio between the average molecular weight by weight (Mw) and the average molecular weight by number (Mn). The dispersion index constitutes a measure of the width of the molecular weight distribution. For most applications, the dispersion index varies between 10 and 30.

It is known in the art that it is not possible to prepare a polyethylene having a broad molecular weight distribution and the required properties simply by mixing polyethylenes having different molecular weights.

As discussed above, high density polyethylene consists of high and low molecular weight fractions. The high molecular weight fraction provides good mechanical properties to the high density polyethylene and the low molecular weight fraction is required to give good processability to the high density polyethylene, the high molecular weight fraction having relatively high viscosity which can lead to difficulties in processing such a high molecular weight fraction. In a bimodal high density polyethylene, the mixture of the high and low melting weight fractions is adjusted as compared to a monomodal distribution so as to increase the proportion of high molecular weight species in the polymer. This can provide improved mechanical properties.

It is accordingly recognised in the art that it is desirable to have a bimodal distribution of molecular weight in the high density polyethylene. For a bimodal distribution a graph of the molecular weight distribution as determined for example by gel phase chromatography, may for example include in the curve a "shoulder" on the high molecular weight side of the peak of the molecular weight distribution.

The manufacture of bimodal polyethylene is known in the art. It is known in the art that in order to achieve a bimodal distribution, which reflects the production of two polymer fractions, having different molecular weights, two catalysts are required which provide two different catalytic properties and establish two different active sites. Those two sites in turn catalyse two reactions for the production of the two polymers to enable the bimodal distribution to be achieved. Currently, as has been known for many years, as exemplified by EP-A-0057420, the commercial production of bimodal high density polyethylene is carried out by a two step process, using two reactors in series. In the two step process, the process conditions and the catalyst can be optimised in order to provide a high efficiency and yield for each step in the overall process. However, the currently commercially employed two step processes suffer from the disadvantage that because two separate serial processes are employed, the overall process has a low throughput.

It would be desirable to provide a one step process for manufacturing bimodal high density polyethylene. EP-A-480316 discloses the production of bimodal polyethylene using a two catalyst mixture of a supported chromium catalyst and a Ziegler-Natta type catalyst. This process suffers from the disadvantage that the Ziegler-Natta catalyst requires a co-catalyst to give an active catalytic system but the co-catalyst can influence the supported chromium catalyst and in particular can detrimentally affect its activity. The applicant believes that the process disclosed in that prior patent specification has not been used commercially.

It is known in the art that the physical properties, in particular the mechanical properties of a polyethylene product vary depending on what catalytic system was employed to make the polyethylene. This is because different catalyst systems tend to yield different molecular weight distributions in the polyethylene produced. Thus for example the properties of a polyethylene product produced using a chromium-based catalyst tend to be different from the properties of a product employed using a Ziegler-Natta catalyst. The production of HDPE using just a chromium-based catalyst is thus desirable to enable the particular polyethylene product to be manufactured. The Encyclopedia of Polymer Science and Engineering, Volume 6, pages 431–432 and 466–470 (John Wiley & Sons, Inc., 1986, ISBN 0-471-80050-3) and Ullmann's Encyclopedia of Industrial Chemistry, Fifth Edition, Volume A21, pages 501–502 (VCH Verlagsgesellschaft mbH, 1992, ISBN 3-527-2012-1) each discuss Phillips and Ziegler-Natta catalysts and the production of HDPE.

There is a need in the art for a process for producing bimodal polyolefins, and in particular bimodal high density polyethylene, using a one step process and employing one chromium-based catalyst which does not encounter the problems of employing a Ziegler-Natta type catalyst as discussed hereinabove.

WO-A-93/09149 discloses olefin polymerisation using an aluminoxane/chromium catalyst, the aluminoxane being employed to adjust the molecular weight distribution. In the process, the molecular weight distribution of the polyalpha-olefin is controlled by changing the aluminoxane to chromium ratio of the catalyst during the polymerisation process. At the beginning of the polymerisation process a relatively low aluminoxane/chromium ratio is employed and this ratio is increased during the process whereby at the end of the process the aluminoxane/chromium ratio is significantly higher. It is disclosed that at certain aluminoxane to chromium ratios, the molecular weight distribution of the resulting polyolefin can become distinctly bimodal. This process suffers from two disadvantages. The first disadvantage is that the requirement to adjust the molar ratio of aluminoxane to chromium during the polymerisation process introduces process limitations and in particular tends to require a batch process rather than a continuous process. The second disadvantage is that the disclosed aluminoxane/chromium mole ratios are very high, requiring significant amounts of aluminoxane to be added. That document further discloses that some combinations of aluminoxane and chromium are not effective for polymerisation and others do not have sufficient productivity to be commercially attractive. Accordingly, that document discloses that he use of aluminoxane in combination with chromium polymerisation catalysts can be rather limited.

DE-A-1745495 discloses a polyethylene polymerisation catalyst including aluminoxane and chromium. This process requires very high aluminium/chromium molar ratios, typically of the order of 1000:1. This process suffers from the disadvantage that extremely high amounts or aluminoxane are required in the polymerisation catalyst. Moreover, there is no suggestion that the catalyst disclosed therein can produce polyethylene having a bimodal molecular weight distribution.

DE-A-3329016 and its equivalent EP-A-0137934 disclose a process for the preparation of polyethylene using a silica xerogel/chromium trioxide catalyst employing an alumoxane as a cocatalyst. The catalyst system has an atomic ratio of chromium in the catalyst to aluminium in the cocatalyst of from 1:1 to 1:300, this tending to require large amounts of alumoxane to be employed in the composite catalyst. There is no disclosure that the composite catalyst can produce polyethylenes having a bimodal molecular weight distribution.

U.S. Pat. No. 4,276,399 discloses the polymerisation of 1-olefins with a supported catalyst consisting essentially of a polymeric hydrocarbon aluminate. There is no disclosure of the production of polyethylene having a bimodal molecular weight distribution.

U.S. Pat. No. 4,025,707 discloses a mixed hydrocarbyloxide treated catalyst activated at different temperatures useful for the manufacture of ethylene homopolymers and copolymers. A composite catalyst comprising several portions of the same or different supported chromium components and metal promoted variations thereof is treated with a hydrocarbyl aluminium hydrocarbyloxide. Again, there is no disclosure of the production of polyethylene having a bimodal molecular weight distribution.

The present invention aims to provide a process for producing polyethylene having a large molecular weight distribution, and in particular a bimodal molecular weight distribution, which overcomes or at least mitigates some of the problems in the prior art discussed above.

Accordingly, the present invention provides a process for producing high density polyethylene having a bimodal molecular weight distribution, the process comprising precontacting a chromium-based catalyst with an alkyl metal oxane, the chromium-based catalyst comprising chromium oxide on a silica-containing support, to form a catalyst system wherein the atomic ratio of the metal of the oxane to the chromium is less than 1, and polymerising ethylene or copolymerising ethylene and an alpha-olefinic comonomer comprising from 3 to 10 carbon atoms in the presence of the catalyst system.

The present invention further provides a catalyst system for polymerising ethylene or copolymerising ethylene and an alpha-olefinic comonomer comprising from 3 to 10 carbon atoms to produce high density polyethylene, the catalyst system comprising in combination a chromium-based catalyst comprising chromium oxide on a silica-containing support and an alkyl metal oxane with which the chromium-based catalyst has been precontacted whereby the atomic ratio of the metal of the oxane to the chromium is less than 1.

The present invention yet further provides a process for producing high density polyethylene having a bimodal molecular weight distribution, the process comprising polymerising ethylene or copolymerising ethylene and an alpha-olefinic comonomer comprising from 3 to 10 carbon atoms in the presence of a catalyst system comprising a chromium-based catalyst comprising chromium oxide on a silica-containing support and an alkyl metal oxane in an amount of around 0.45 wt % based on the weight of the chromium-based catalyst.

The present invention is predicated on the surprising discovery by the present inventor that the addition of a specific amount of an alkyl metal oxane to a chromium-based catalyst comprising chromium oxide on a silica-containing support can unexpectedly yield high density polyethylene having a bimodal molecular weight distribution.

Without being bound by theory, it is believed that this unexpected effect resulting from the combination of the alkyl metal oxane with the chromium-based catalyst provides a high dispersion of active sites in the composite catalyst system yielding the creation of a different type of catalytic site as compared to that present in the chromium-based catalyst alone, which in turn enables the production of bimodal HDPE to be achieved.

The alkyl metal oxane for use in the process and catalyst system of the present invention incorporates a metal-oxygen-metal bond constituting the oxane bond. Preferably, the alkyl group of the alkyl metal oxane comprises methyl or ethyl. The metal of the alkyl metal oxane may comprise aluminium or boron. A particularly preferred alkyl metal oxane is methyl aluminium oxane. Typically, the alkyl metal oxanes are prepared by reacting the appropriate alkyl metal with a controlled amount (i.e. not an excess amount) of water. Thus for example methyl aluminium oxane may be prepared by reacting trimethyl aluminium (TMAL) with water.

Other suitable metal alkyl oxanes for use in the present invention comprise ethyl aluminium oxane and ethyl boron oxane.

The chromium based catalyst comprises a chromium oxide catalyst having a silica-containing support. A particularly preferred chromium-based catalyst may comprise from 0.5 to 5wt % chromium, preferably around 1 wt %, based on the weight of the chromium-containing catalyst on a catalyst support, such as a composite silica and titania support, the catalyst having been activated in a dry oxidising environment at elevated temperature, e.g. around 550 to 850° C., more preferably around 650 to 720° C. The chromium-based catalyst may have a specific surface area of from 230 to 750$^2$/g, preferably from 400 to 600 m$^2$/g and a volume porosity of from 1 to 3 cc/g, preferably from 1.3 to 2.7 cc/g. The average pore diameter is from 70 to 500A, typically 180 to 190A. Alternative supports comprise silica, alumino silicates with low alumina content, oxides of Ti, Zr, Ge, and Th and $AlPO_4$.

The catalyst may be fluoridized in known manner, in order to increase she activity of the catalyst. For example the chromium catalyst may be premixed with ammonium boron tetrafluoride ($NH_4BF_4$) in solid form, with the composite catalyst then being activated In air at an elevated activation temperature. Alternatively, the chromium-based catalyst may be pretreated by chemical reduction, for example by dry carbon monoxide, in known manner at a temperature of from 300 to 500° C. This can increase the throughput of polyethylene in the reactor by decreasing the initial induction period of the catalyst in which there is a reduced catalytic affect as a result of the ethylene slowly chemically reducing the chromium in the chromium-based catalyst.

A particularly preferred chromium-based catalyst for use in the present invention comprises the catalyst sold in commerce under the trade name Magnapore 963 by Grace GmbH, D-57545 Worms, Germany, this catalyst having been treated at an activation temperature of around 650 to 720° C., and optionally having been fluoridized or chemically reduced as described hereinabove. The Magnapore 963 catalyst is a tergel catalyst and comprises amorphous silica promoted with chromium-oxide and titanium oxide and has (according to the manufacturer's data sheets) a volume porosity of greater than 2.3 cc/g, a specific surface area of 420 to 450 $m^2/g$, a chromium content of 0.8 to 1.1wt % and a titanium content of 2.3 to 2.7 wt %, each weight percentage being based on the weight of the dry catalyst.

In accordance with a preferred aspect of the invention, the alkyl metal oxane pre-contacts the chromium-based catalyst thereby to deposit the alkyl metal oxane on the silica-containing support for the catalyst. The amount of alkyl metal oxane is selected whereby in the resultant catalyst system the metal/chromium atomic ratio is less than 1, and more preferably from 0.1 to less than 1. Without being bound by theory, it is believed that the provision of a less than unity atomic (or molar) ratio between the metal of the alkyl metal oxane and the chromium of the chromium oxide leads to the presence of two distinct catalytic sites on the composite catalyst which, as described hereinabove, enable the production of bimodal HDPE to be achieved, since each catalytic site tends to catalyse the polymerisation of a respective low or high molecular weight fraction of the resultant polyethylene resin. By providing a low atomic ratio the metal of the alkyl metal oxane, most particularly aluminium, to chromium, this ensures that there are sufficient chromium sites present in the composite catalyst to enable both sites to be fully effective in the polymerisation reaction. It is believed that if excess alkyl metal oxane were employed, then this would tend to swamp the chromium catalytic sites, and reduce the effectiveness of the catalyst for producing bimodal high density polyethylene. In order to achieve the preferred atomic ratio of metal e.g. aluminium to chromium, when the alkyl metal oxane is present in a diluent and pre-contacts the chromium-based catalyst, for an amount of catalyst of around 250 milligrams and for the catalyst having a chromium content of around 1 wt %, the alkyl metal oxane preferably comprises from 0.5 to 5 ppm, most typically around 2 ppm, based on the weight of the diluent. The alkyl metal oxane more preferably comprises around 0.45 wt %, based on the weight of the chromium-based catalyst, this corresponding to 2 ppm alkyl metal oxane for the catalyst type and amount specified above (250 mg catalyst and 1 liter of the diluent, isobutane).

In the preferred process of the present invention the polymerisation or copolymerisation process is carried out in the liquid phase comprising ethylene, and for copolymerisation an alpha-olefinic comonomer comprising from 3 to 10 carbon atoms, in an inert diluent. The comonomer may be selected from 1-butene, 1-pentene, 1-hexene, 4-methyl 1-pentene, 1-heptene and 1-octene. The inert diluent is preferably isobutane. The polymerisation or copolymerisation process is typically carried out at a polymerisation temperature of from 85 to 110° C. and at a pressure of from 20 to 42 bar. A preferred temperature is 85° C. at a minimum pressure of 24 bar.

Typically, the ethylene monomer comprises from 0.5 to 8% by weight and the comonomer when present comprises from 0.5 to 6% by weight, each based on the total weight of the monomer and comonomer in the inert diluent. A particularly preferred starting composition comprises 6% by weight ethylene and 1.5% by weight 1-hexene, each based on the total weight of the combination of the ethylene and 1-hexene in isobutane.

The alkyl metal oxane catalyst and the chromium-based catalyst, being either precontacted as described above prior to the polymerisation reaction, or alternatively separate, are introduced into the polymerisation reactor. The alkylene, monomer, and comonomer, are also introduced into the polymerisation reactor and the polymerisation product is discharged from the reactor and separated from the diluent which can then be recycled.

The process of the present invention can provide high density polyethylene resins having a low melt index and density typical of high density polyethylenes but with a high degree of bimodality as evidenced by gel phase chromatography of the polyethylene produced by the process of the present invention.

The present invention will now be described with reference to the following non-limiting Examples and with reference to the following drawings, in which:

FIGS. 1 to 5 are gel phase chromatography graphs of high density polyethylenes produced in accordance with Examples 1 to respectively of the present invention; and FIGS. 6 to 9 are gel phase chromatography graphs of high density polyethylenes produced in accordance with Comparative Examples 1 to 4 respectively.

In order to demonstrate the process of the present invention in which a catalyst system of a chromium-based catalyst and an alkyl metal oxane was employed and, in order to provide a comparison with other catalyst systems employing an equivalent chromium-based catalyst but in combination with a metal alkyl, such as triethyl boron (TEB) and triethyl aluminium (TEAL), a number of runs to polymerise ethylene to form high density polyethylene were performed. In each of the Examples and the Comparative Examples, a liquid comprising 6 wt % $C_2$ (ethylene), 1.5 wt % $C_6$ (1-hexene) and the balance isobutane as an inert diluent was fed into a polymerisation reaction zone at a pressure of 24 bars and at a polymerisation temperature of 85° C.

The catalyst system was also fed into the polymerisation reaction zone. In each of the Examples and the Comparative Examples, the chromium-based catalyst had been pre-contacted with, in accordance with the Examples of the process, methyl aluminium oxane in an amount of 2 ppm and in the case of the Comparative Examples, either triethyl boron or triethyl aluminium, each in an amount of 2 ppm. For this catalyst having a chromium content of around 1 wt % and which was present in an amount of 250 mg, this amount of alkyl metal oxane corresponded around 0.45 wt % based on the weight of the chromium based catalyst. In each of the Examples and Comparative Examples, the chromium-based catalyst consisted of the product sold under the trade name Magnapore 963 as discussed hereinabove, and in Example 5 and Comparative Examples 2 and 4, the chromium-based catalyst had been subjected to an initial carbon monoxide reduction in known manner. In each of the Examples and Comparative Examples, the chromium-based catalyst had been activated at an elevated activation temperature as indicated hereinbelow.

EXAMPLES 1 to 5

TABLE 1

| Example | Chromium-based Catalyst | Alkyl Metal Oxane | Activation Temperature (° C.) | HLMI (g/10') | Density (g/cc) |
|---|---|---|---|---|---|
| 1 | Magnapore 963 | Methyl aluminium oxane | 650 | 2.4 | 0.9483 |
| 2 | Magnapore 963 | Methyl aluminium oxane | 650 | too low | — |
| 3 | Magnapore 963 | Methyl aluminium oxane | 720 | 4.3 | 0.9478 |
| 4 | Magnapore 963 | Methyl aluminium oxane | 720 | 4.3 | 0.9479 |
| 5 | CO reduced Magnapore 963 | Methyl aluminium oxane | 650 | too low | — |

Table 1 summarizes the conditions employed in Examples 1 to 5 and also indicates the high load melt index (HLMI) and the density of the resultant high density polyethylene products. The high load melt index (HLMI) is determined using the procedures of ASTM D1238 using a load of 21.6 kg at a temperature of 190° C. The HLMI is broadly inversely indicative of the molecular weight of the polymer. In other words a low melt index is indicative of a high molecular weight for the polyethylene. For each Example, the gel phase chromatography yielded not only a graph having a curve representing the molecular weight distribution but also a computation of the average molecular weight by number (Mn); the average molecular weight by weight (Mw); a parameter Mz representing the shape of the tail of the high molecular weight part of the curve; the value of the molecular weight at the peak of the curve (Mp); the dispersion index D representing the ratio Mw/Mn; the dispersion index D representing the ratio Mz/Mw; and the area A under the curve of the graph. These values are represented in each of the drawings. The curves of FIGS. 1 to 5 each show a "shoulder" at the high molecular weight side of the peak of the curve, around the value Mw. Such a shoulder is indicative of a bimodal molecular weight distribution in the high density polyethylene.

Comparative Examples 1 to 4

TABLE 2

| Comparative Example | Chromium-based Catalyst | Metal Alkyl | Activation Temperature | HLMI (g/10') | Density (g/cc) |
|---|---|---|---|---|---|
| 1 | Magnapore 963 | Triethyl boron | 650 | 4.3 | 0.9478 |
| 2 | CO reduced Magnapore 963 | Triethyl boron | 650 | 5.1 | — |

TABLE 2-continued

| Comparative Example | Chromium-based Catalyst | Metal Alkyl | Activation Temperature | HLMI (g/10') | Density (g/cc) |
|---|---|---|---|---|---|
| 3 | Magnapore 963 | Triethyl aluminium | 650 | 4.0 | — |
| 4 | CO reduced Magnapore 963 | Triethyl aluminium | 650 | 6.1 | 0.9367 |

The conditions and results of Comparative Examples 1 to 4 are summarized in Table 2 and FIGS. 6 to 9 illustrate curves obtained by gel phase chromatography on the resultant high density polyethylene products. It will be seen that none of the curves of FIGS. 6 to 9 exhibit a bimodal distribution of the molecular weight as is demonstrated by the curves of FIGS. 1 to 5 representing the Examples of the process of the present invention.

Figure 3:
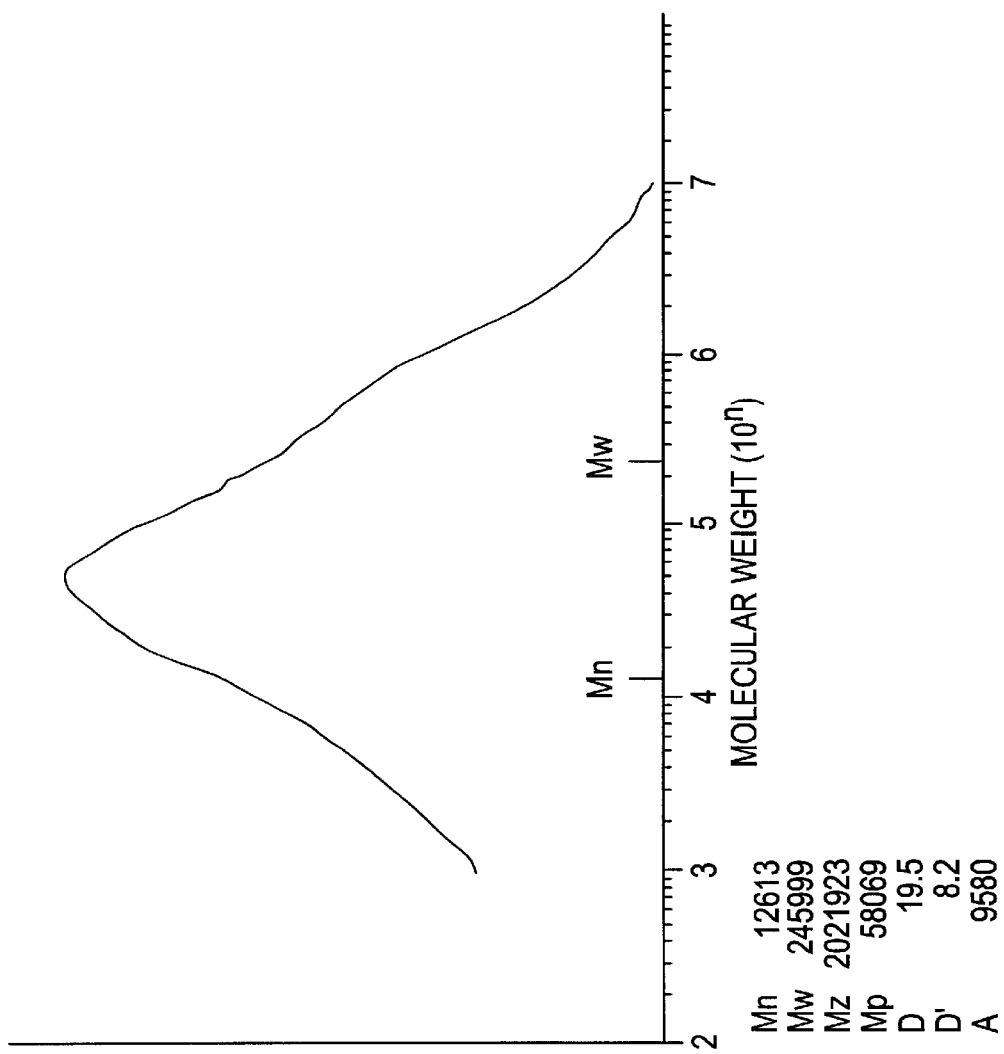
Figure 4:
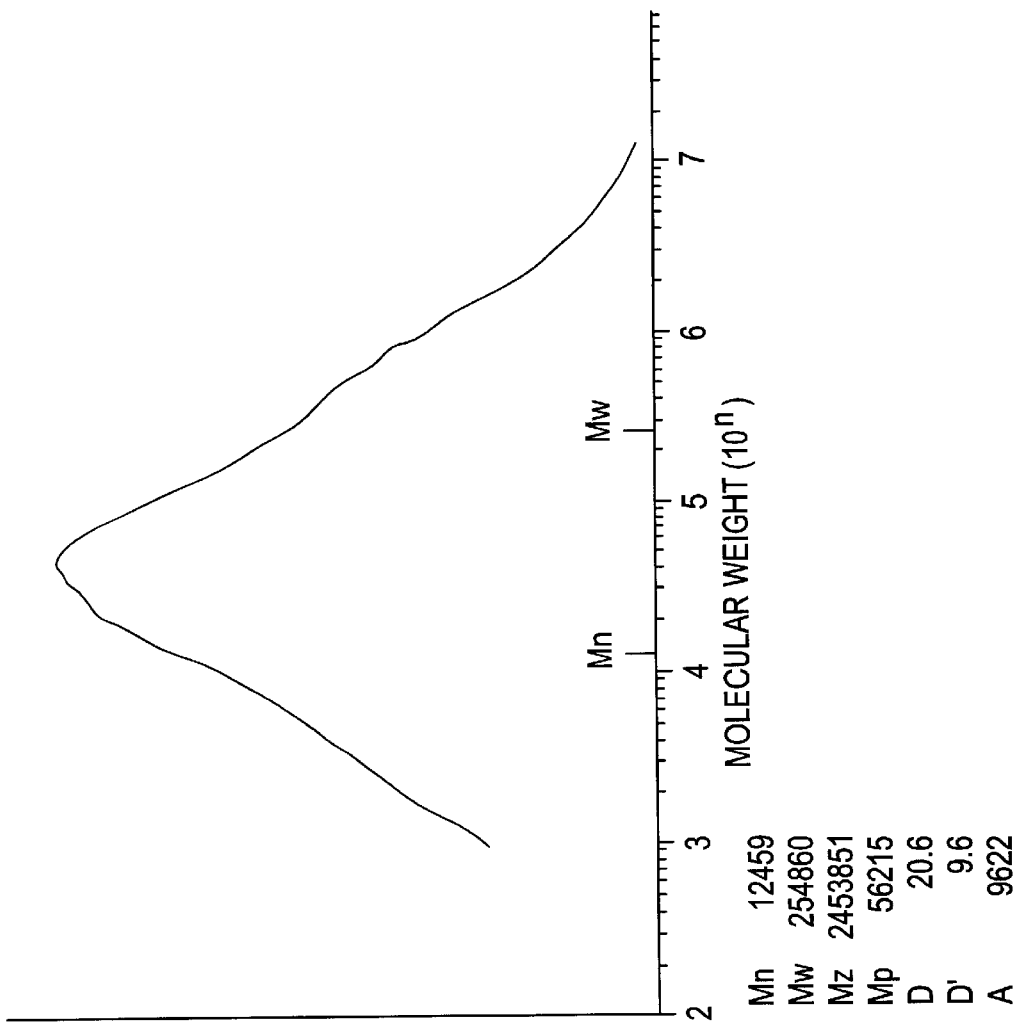
Figure 5:
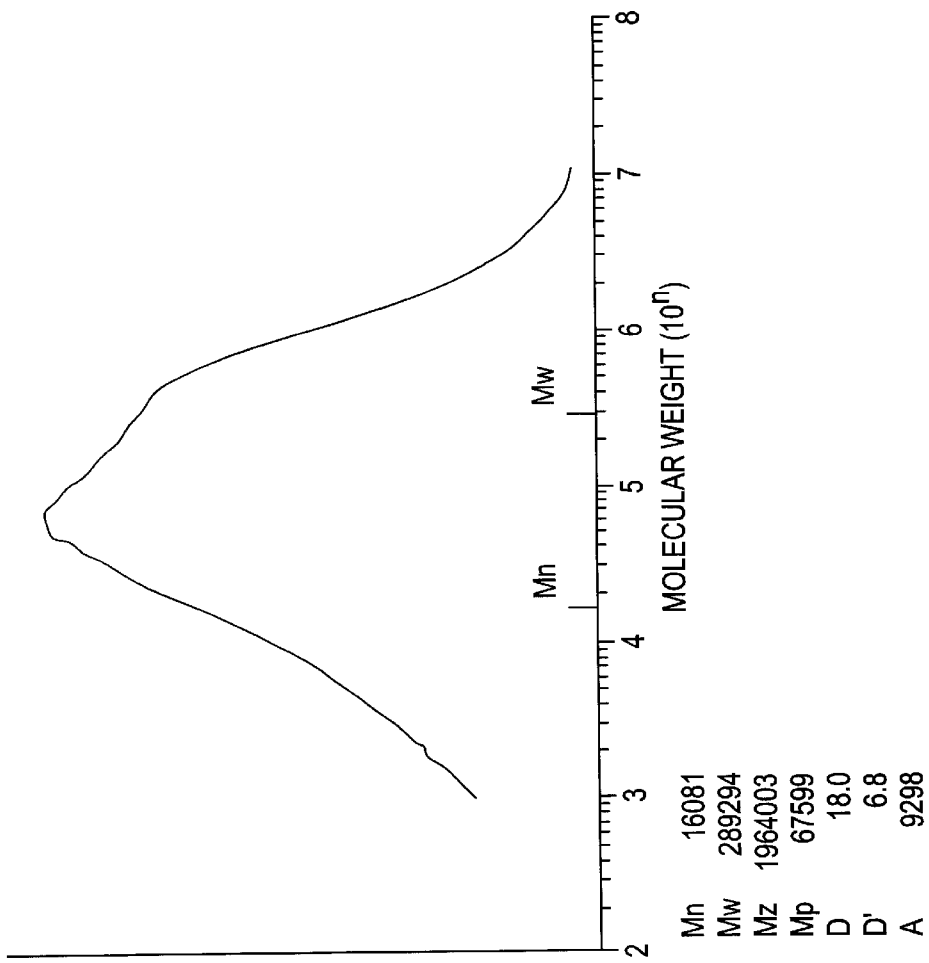
Figure 6:
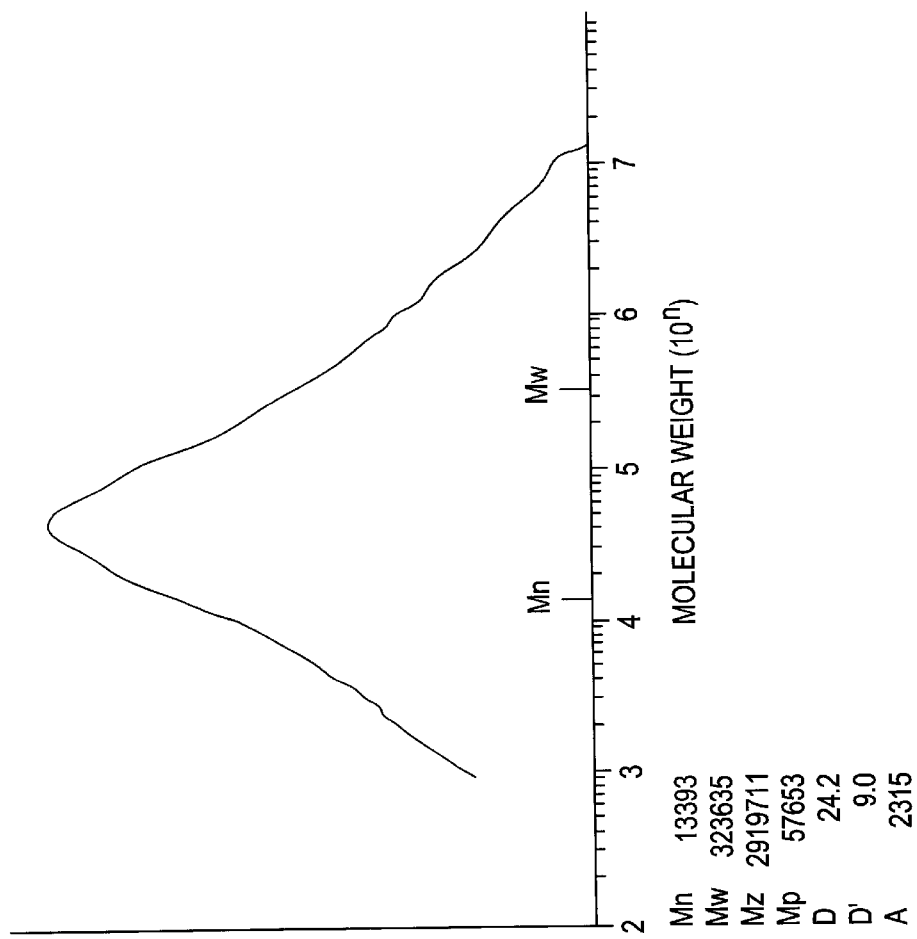
Figure 7:
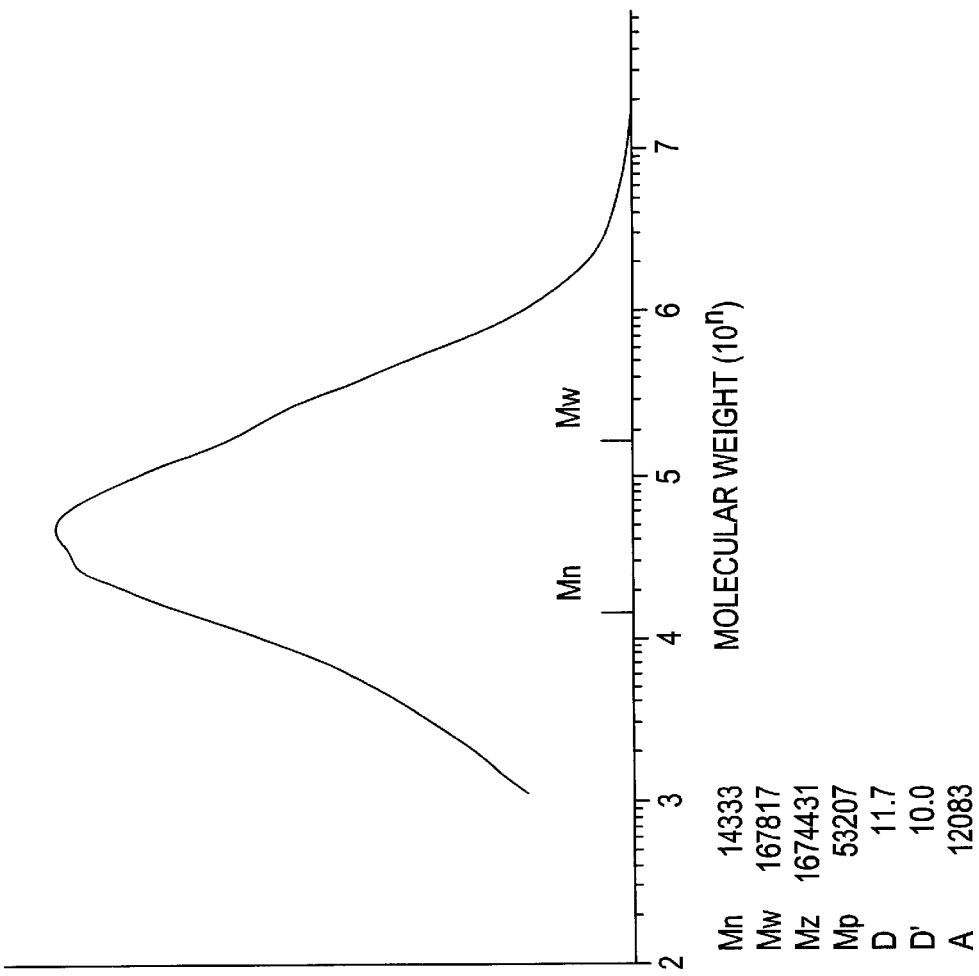
Figure 8:
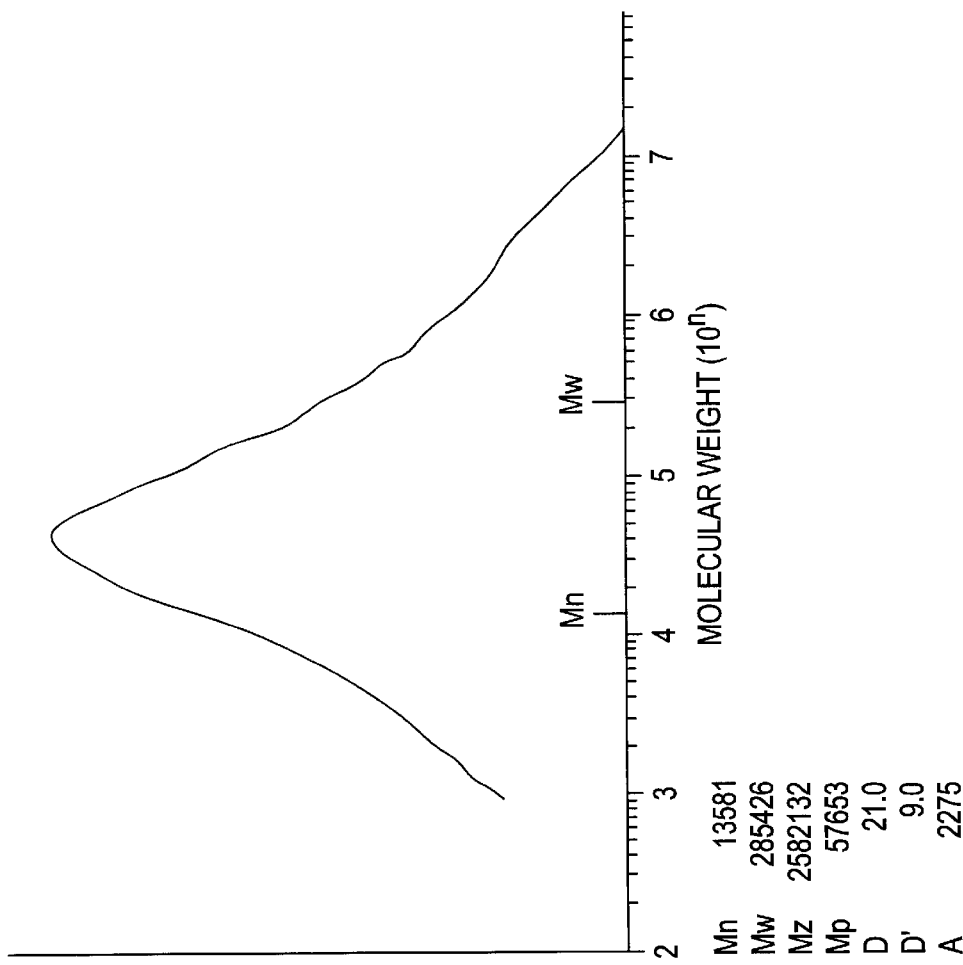
Figure 9:
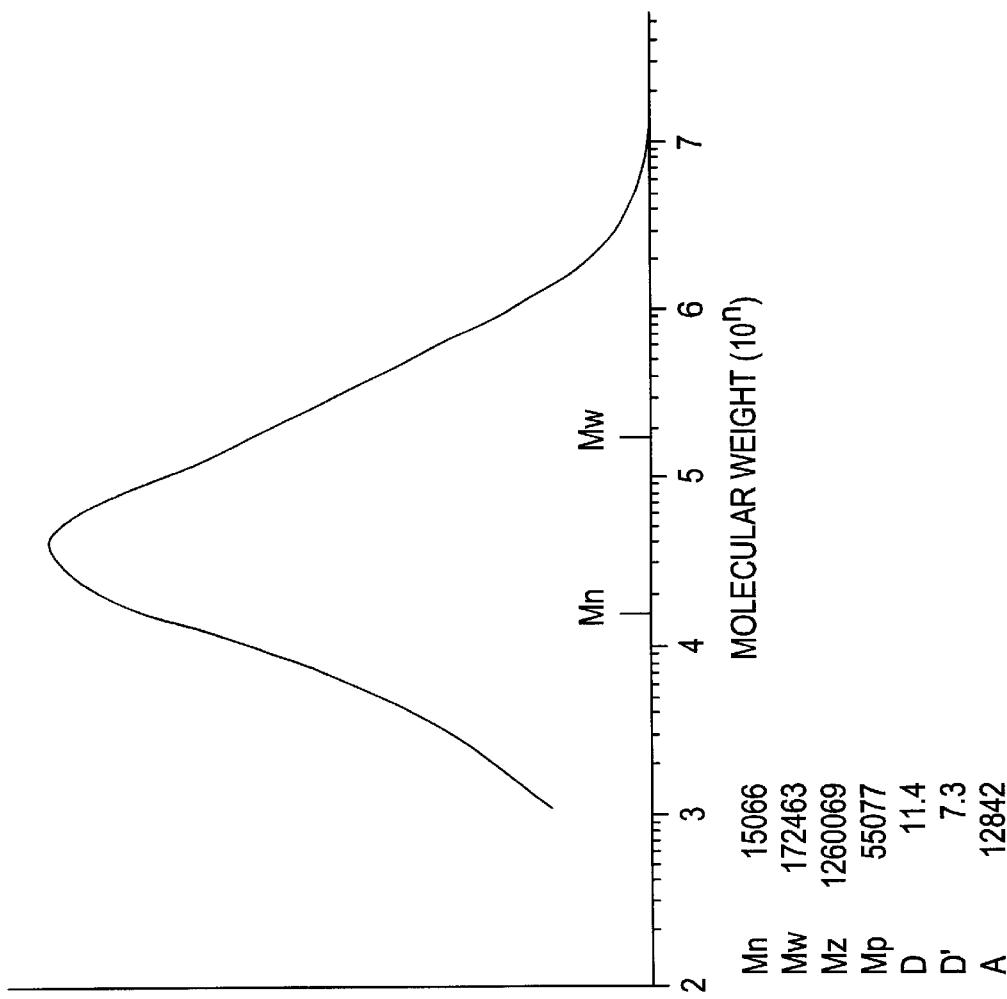

A clear and direct comparison can be made between the HDPE product of Comparative Example 1 and Examples 3 and 4 which have a substantially identical HLMI and density, but yet a significantly different degree of modality in the molecular weight distribution. FIGS. 3 and 4 clearly demonstrate a bimodal molecular weight distribution obtainable by the process of the present invention, whereas FIG. 6 demonstrates a monomodal distribution.

A comparison of the curves of FIGS. 1 to 5 with those of FIGS. 6 to 9 shows that the process of the present invention, employing a catalytic system of a chromium-based catalyst with an alkyl metal oxane can generally yield a broader distribution of the molecular weight distribution as compared to a process employing a metal alkyl instead of the alkyl metal oxane.

In Table 1 the HLMI values of Examples 2 and 5 are indicated as being "too low", which indicates a very high molecular weight for the products obtained by those Examples, which in turn resulted from the particular measuring method for obtaining the HLMI value not being sufficiently sensitive to measure such low HLMI values. For example, FIG. 5 relating to Example 5 clearly indicates a very high molecular weight value Mw which in turn explains the HLMI value being too low to measure by the specific test employed. In some of the Examples and Comparative Examples, the density value was not measured.

What is claimed is:

1. A catalyst system for polymerizing ethylene or copolymerizing ethylene and an alpha-olefinic comonomer comprising from 3 to 10 carbon atoms to produce high density polyethylene having a bimodal molecular weight distribution, the catalyst system comprising in combination a chromium-based catalyst comprising chromium oxide on a silica-containing support and an alkyl metal oxane with which the chromium-based catalyst has been precontacted whereby the atomic ratio of the metal of the oxane to the chromium is less than 1.

2. A catalyst system according to claim 1 wherein the metal/chromium atomic ratio is from 0.1 to less than 1.

3. A catalyst system according to claim 1 wherein the alkyl metal oxane comprises methyl aluminum oxane.

4. A catalyst system according to claim 1 wherein the alkyl metal oxane comprises around 0.45 wt % based on the weight of the chromium-based catalyst.

5. A catalyst system according to claim 1 wherein the catalyst system is present in an inert diluent and the alkyl metal oxane comprises from 0.5 to 5 ppm based on the weight of the diluent.

* * * * *